Patented Oct. 13, 1936

2,057,479

UNITED STATES PATENT OFFICE 2,057,479

PROCESS OF TREATING MEAT PROTEINS

Elton R. Darling, Rockford, Ill., assignor to Chappel Bros. Inc., Rockford, Ill., a corporation of Delaware No Drawing. Application February 14, 1935, Serial No. 6,539

9 Claims. (Cl. 99—110)

This invention relates to the production of meat products from raw meat proteins. The products are either in the form of a dry solid which is water insoluble or a paste which is water soluble, the main inventive concept being directed to certain steps in the process of treating the meat, as will be hereinafter fully explained.

One of the major objects of the invention is to obtain a product containing a maximum amount of the nutritive constituents of the meat but without the non-protein-nitrogen fraction of the meat. Such a product has been found to be highly nutritive and hence readily assimilated by the digestive tract.

A further object of the invention is the preparation of a meat product by a process which avoids in certain phases the use of heat or cooking temperatures.

A further object of the invention is the preparation of a meat product which is free from the non-protein-nitrogen fraction, the fat, and the connective tissue.

Still another object of the invention is the preparation of a meat product in such a manner that the final product is made up of proteins which are high in the essential amino acids and is therefore a more nutritious product than the meat itself. Such a product is also of higher biological value than the meat and hence more nutritious for that reason also.

A further object of the invention is the preparation of a dried meat product that is free from any products of deterioration through either physical or chemical changes and free from undesirable flavors or odors.

In this connection attention is directed to applicant's copending applications Serial No. 684,013, filed August 7, 1933, and Serial No. 710,593, filed February 10, 1934, the present invention being an improvement in the processes shown and described therein.

Referring for the moment to application Serial No. 684,013, this describes a process of producing a dried meat protein in which the meat, after first being slightly comminuted, is extracted with water for the purpose of removing soluble matter therefrom. In the process described in the said application no particular use is made of the water extract because the main object to be attained by the said process is the preparation of the residual material which is freed from connective tissue by trituration in the presence of water, followed by separation of the connective tissues which are discarded, whereafter the residual meat protein, insoluble in water, is dried.

Application Serial No. 710,593 describes a process in which the water extracts first produced are employed in connection with the meat protein which is insoluble in water, the two being mixed with each other and then subjected to hydrolysis in order to reduce the same to amino acids.

In accordance with the present invention, however, a further step has been developed, which has been found to be of great value in the process of either of the preceding applications, and whenever it is desired that the water extract first obtained be converted into useful products.

Meat contains a natural acidity which varies considerably, depending upon the condition of the animal at the time it was slaughtered. If the animal has been subjected to considerable exercise, excitement, and fatigue, the meat will be found to be considerably high in lactic acid, while if the animal has been thoroughly rested, the lactic acid content is quite low. The surprising discovery has been made that the meat proteins in natural freshly killed meat are apparently in very carefully balanced equilibrium with the hydrogen-ion concentration of the fluids which surround the protein particles; hence when such meat is comminuted and washed, there will take place progressive changes as the hydrogen-ion concentration diminishes as a result of the dilution. In other words, if meat from an animal which has been heavily exercised before being killed—and hence is fairly acid—is extracted with water, the extract will be found to have a hydrogen-ion concentration which may vary all the way from pH 6.5 to as high as pH 3.5. If such meat is extracted with water, the first aqueous extract obtained will have a hydrogen-ion concentration substantially as high as that of the meat itself. If the meat is then washed with fresh water, the extract naturally will have a lower hydrogen-ion concentration; but it will be found that less solids will be extracted than by the first washing, this lessening in the extractive power of the water being due to the fact that there are less hydrogen ions present. Hence, in order to obtain the maximum amount of soluble extractives, the hydrogen-ion concentration of the water employed should be maintained at substantially the same point as that of the first or initial extract.

Furthermore, it has been noticed that when muscular tissue is extracted with water, such extracts show, by analysis, a certain acidity.

In carrying out the water treatment of the meat to remove the water-soluble fraction which contains most of the non-protein-nitrogen fraction of the meat, this acidity gradually lessens. As this lessening of the acidity takes place, the wash or extract becomes cloudy, and there remains a slight coloration in the meat residue that is difficult to remove economically. It has been found that if the wash waters are maintained at the acidity of the first extract, not only do the subsequent wash waters remain clear but the extraction of the coloration is such that a nearly white residue results. It has also been found that any acid can be used for the carrying out of this operation, but it is preferred to use lactic acid, which is nearest to the natural acids occuring in the muscle meats. The acidity cannot be expressed in definite terms and hence is referred to in terms of hydrogen-ion concentration. No fixed hydrogen-ion concentration can be stated, owing to the fact that the degree of acidity of the meat varies from time to time. By keeping the hydrogen-ion concentration throughout the extraction the same as it was in the first water extract, a satisfactory carrying out of the process is possible. Care must be taken as to the amount of acid used, an excess of acid causing the solution of the connective tissue, which is undesirable.

For example, if it is desired to utilize the water extract obtained in connection with a process such as that shown in applicant's prior application Serial No. 684,013, the procedure may be substantially as follows:

The meat is first relieved of as much of the fat as possible, this being accomplished by trimming, whereupon the meat itself is ground to a medium degree of fineness by means of an ordinary meat grinder or chopper. The size of the individual particles thus produced should be larger than 40 mesh. The ground meat is then placed into a suitable container and is therein treated with cold water, preferably at a temperature of between 45° and 50° F., under conditions minimizing the development of putrefactive bacteria. This initial extraction of the meat is carried on for up to about two hours, the extract being removed from the meat by any ordinary means such as filtration or decantation.

As a guide to the relative quantities of meat and water used, it is suggested that for every 500 grams of meat about 2000 milliliters of water be used. In most cases, 30 minutes' contact will be sufficient for the initial extraction. During the first half of the period of extraction, mild agitation may be resorted to so as to insure proper contact between the meat and fluid. When separated from the fluid, the initial extract will ordinarily yield about 1600 to 1800 milliliters of fluid. The hydrogen-ion concentration of the initial extract is then determined electrically by means of a quinhydrone electrode, its numerical value depending upon the activity of the animals before being slaughtered. This may vary from pH 6.5 to as high as pH 3.5 but is usually around pH 5. A quantity of water equivalent in volume to that of the initial extract is then acidified, preferably by means of lactic acid, so that its hydrogen-ion concentration will be substantially the same as that of the initial extract. The meat is then subjected to extraction with this acidified water for about the same period of time. The secondary extract is then removed in the same manner as the initial extract, and a third amount of water is added, equivalent in volume to that of the extract, this water likewise being acidified to the same hydrogen-ion concentration. A third, then a fourth, and possibly even a fifth extraction are made in exactly the same manner, the main point being to maintain during the extraction the hydrogen-ion concentration of the initial extract. The extracts thus obtained are combined.

The acidity of the combined extracts is then increased by means of lactic acid, or its equivalent, to a point where a small sample of the combined extracts, when removed and subjected to heat, as in a test tube, will no longer form a precipitate when heated to the boiling point. In place of the lactic acid, any other non-oxidizing or non-carbonizing acid may be used, provided only that it be non-volatile.

The thus acidified combined extract is then evaporated, preferably under a vacuum, until its volume is reduced to about one-half of the original volume, whereupon sufficient alkali, such as sodium carbonate, is added so that the hydrogen-ion concentration of the partly evaporated extract will be reduced to substantially equal that of the initial extract. Evaporation is then continued, and as the evaporation proceeds more alkali is added from time to time, as the volume diminishes, so as to maintain the hydrogen-ion concentration substantially equal to that of the original extract; that is to say, the further evaporation is carried on at constant hydrogen-ion concentration. The purpose of this is to prevent undesired hydrolysis of the water-soluble material contained in the extract. The evaporation is finally carried out to a point where a pasty mass remains, containing about 50% volatile matter; that is to say, water.

The product thus obtained is a valuable extract of meat which may serve for feeding purposes, therapeutical purposes, or for incorporation with the other meat solids which have remained insoluble during the extraction and which in general are treated as shown in applicant's copending application Serial No. 684,013.

The insoluble meat proteins, if it is desired to unite them with the meat extract, are placed in a ball mill with water and are therein triturated, using stone pebbles or balls from one inch to two inches in diameter, whereafter the mill is placed into operation so as to triturate the meat and cause its separation from the relatively resistant connective tissue. The trituration is continued for about two hours, preferably at a temperature not above 50° F., whereupon the contents of the ball mill are discharged through a very coarse screen merely to separate the grinding stones or pebbles, whereupon the material passing through this coarse screen is then passed through a 40-mesh screen. The latter will retain the tissue, cartilage and the like, which, because of their resistant nature, have withstood the grinding action of the balls in the ball mill. The fibrous portion of the meat, having been finely comminuted by the grinding, will pass through the screen together with the water. The slush thus obtained is transferred to a rather tall vessel wherein it is allowed to settle, which action takes place quite slowly. During this settling, whatever fat may have been contained between the tissues of the meat rises to the top and may be skimmed off while the protein material settles to the bottom. It is thus easy to separate the fat, the supernatant liquid and the protein slush. This slush is then separated from the water by any suitable means but, if it is desired to keep it separate and obtain it in dry form, may be spray-dried. However, this meat protein slush may be directly combined with the previous extract and then subjected to enzymatic hydrolysis to produce amino acids exactly in the manner described in applicant's copending application Serial No. 710,593.

The essential features of the present invention reside in the maintenance of a hydrogen-ion concentration equal to that of the initial extract when making the subsequent extractions, and in the particular method of treating the combined extracts when evaporating the same to small bulk.

The invention is not limited to any particular kind of meat and may be applied to flesh, fowl, or fish.

I claim:

1. The process of treating meat protein which comprises extracting meat with water, determining the hydrogen-ion concentration of the initial extract thus obtained, and then again subjecting the extracted meat to further extractions with water which has been acidified to a hydrogen-ion concentration substantially equal to that of the initial extract.

2. The process of treating meat protein which comprises treating comminuted meat with water to obtain an extract, determining the hydrogen-ion concentration of the extract, and then treating the extracted meat with further quantities of water having a hydrogen-ion concentration substantially equal to that of the initial extract.

3. The process of treating meat which comprises comminuting the same, extracting the same with water to yield an initial extract, acidifying a further quantity of water to a point where it has a hydrogen-ion concentration substantially equal to that of the initial extract and treating the meat with the thus acidified water, removing the extract to form a second extract, and then again extracting the meat with water having a hydrogen-ion concentration substantially equal to that of the first extract.

4. The process of producing a meat extract which comprises extracting meat with water to produce an aqueous extract thereof, determining the hydrogen-ion concentration thereof, then acidifying the extract to a point where under the influence of heat thereon no precipitation of protein matter takes place, thereupon evaporating the extract to about one-half of its initial volume, then adding thereto neutralizing material in an amount sufficient to reduce the hydrogen-ion concentration thereof to a point between pH 6.5 and pH 3.5 substantially equal to that initially determined for the original extract and continuing the evaporation while maintaining the thus established hydrogen-ion concentration.

5. The process of treating meat which comprises extracting the same with water to yield an extract, determining the hydrogen-ion concentration of the latter, acidulating water to a hydrogen-ion concentration substantially equal to that of the initial extract and extracting the meat therewith to form a secondary extract, again extracting the meat with water having the aforesaid hydrogen-ion concentration to form a third extract, and repeating the extraction in a similar manner for a number of times, combining all the extracts thus obtained and acidifying the liquid thus obtained to a point where no protein will be precipitated therefrom when heated to substantially the boiling point of water, evaporating the total liquid thus obtained to substantially one-half its volume and then reducing its hydrogen-ion concentration by means of a neutralizing agent to substantially the hydrogen-ion concentration of the initial extract, and then continuing the evaporation to pasty consistency while maintaining the said hydrogen-ion concentration by additions of a neutralizing agent as the evaporation proceeds.

6. The process of extracting meat which comprises comminuting the same, treating it with water to yield an initial extract, washing the extracted meat with further quantities of water having a hydrogen-ion concentration substantially equal to that of the initial extract, combining the initial and secondary extracts thus obtained and evaporating the same at a hydrogen-ion concentration great enough to prevent precipitation of meat proteins when heated to the boiling point until the volume has been reduced to one-half, then reducing the hydrogen-ion concentration (which as a result of the evaporation has become increased) to a point substantially equal to that of the hydrogen-ion concentration of the initial extract, and then completing the evaporation while maintaining the latter hydrogen-ion concentration.

7. The process of producing a meat extract which comprises comminuting meat with water to yield an extract, determining the hydrogen-ion concentration of the latter and then acidifying said extract so that the latter when heated to the boiling point of water will not yield a precipitate of protein matter, evaporating this acidified extract to substantially one-half its bulk, then reducing the hydrogen-ion concentration to a point substantially equal to that of the initial extract, and continuing the evaporation to pasty consistency while maintaining the latter hydrogen-ion concentration.

8. The process of producing useful edible products from meat which comprises comminuting meat, treating it with water to produce an initial extract, repeating the treatment with water having a hydrogen-ion concentration substantially equal to that of the initial extract, combining the thus obtained aqueous extracts, acidifying them to a point where they will not yield a precipitate on being heated and then concentrating them to one-half their volume by evaporation, adjusting and subsequently maintaining the hydrogen-ion concentration of the concentrate to and at a pH substantially equal to that of the initial extract during further evaporation to yield a water-soluble meat extract.

9. The process as defined in claim 1, in which the water used for further extractions has been acidified with lactic acid to a hydrogen-ion concentration substantially equal to that of the initial extract.

ELTON R. DARLING.